(12) United States Patent
Hu

(10) Patent No.: US 6,594,397 B1
(45) Date of Patent: Jul. 15, 2003

(54) ADAPTIVE MULTI-MODAL MOTION ESTIMATION FOR VIDEO COMPRESSION

(75) Inventor: Shane Ching-Feng Hu, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/518,429

(22) Filed: Mar. 3, 2000

(51) Int. Cl.⁷ .................................................. G06K 9/36
(52) U.S. Cl. ........................ 382/236; 382/239; 382/240; 375/240
(58) Field of Search ................................. 382/236, 240, 382/239; 375/240, 240.1

(56) References Cited

U.S. PATENT DOCUMENTS

| | | | |
|---|---|---|---|
| 5,748,247 A | 5/1998 | Hu | 348/413 |
| 6,148,027 A | * 11/2000 | Song et al. | 375/240 |
| 6,208,692 B1 | * 3/2001 | Song et al. | 375/240.19 |
| 6,430,317 B1 | * 8/2002 | Krishnamurthy et al. | 382/236 |

OTHER PUBLICATIONS

Youn et al., "Motion Vector Refinement for High–Performance Transcoding", IEEE Transactions on Multimedia, vol. 1, No. 1, Mar. 1999, pps. 30–40.*

"Displacement Estimation by Hierachical Blockmatching", M. Bierling, SPIE Visual Communications and Image Processing 1988, Vo. 1001, pp. 942–951.

"Displacement Measurement and Its Application in Interframe Image Coding", Jaswant R. Jain and Anil K. Jain, IEEE Transactions on Communications, vol. COM–29, pp. 1779–1806 (1981).

"Template Matching and Correlation Techniques", HALL, Computer Image Processing and Recognition, Academic Press 1979, pp. 480–484.

* cited by examiner

*Primary Examiner*—Anh Hong Do
(74) *Attorney, Agent, or Firm*—Francis I. Gray

(57) ABSTRACT

An adaptive multi-modal motion estimation algorithm for video compression builds a luminance pyramid for each image of a moving image sequence. From the top level image of the luminance pyramid a global motion vector is determined between images at times t and t+n. The global motion vector is used as a pivot point and to define a search area. For each block of a current top level image a search for a match is carried out around the pivot point within the search area. The resulting block motion vectors serve as initial conditions for the next higher resolution level. A refinement process results in a displaced frame difference value (DFD) for each block as an error measure. If the error measure is small, the motion vector is chosen as the motion vector for the current block. If the error measure is large, then a search within the search area around a zero motion pivot point is conducted. The motion vector that results in the smallest error measure is chosen as the motion vector for the current block. The refinement and zero pivot searches are repeated for each level down to the full resolution base of the pyramid, resulting in the desired estimated motion vectors for the image.

1 Claim, 2 Drawing Sheets

ADAPTIVE MULTI-MODAL MOTION ESTIMATION FOR VIDEO COMPRESSION

BACKGROUND OF THE INVENTION

The present invention relates to video compression, and more particularly to adaptive multi-modal motion estimation for video compression.

The use of motion compensation in video coding plays an important role in achieving better compression efficiency by removing the temporal redundancy in video sequences. The MPEG-2 video compression standard, as defined in ANSI-ISO/IEC 13818-2 (1995) and MPEG2 Test Model 5 (1993), uses a block-based motion estimation and compensation technique. A displaced frame difference (DFD) is a common error measure used in block matching motion estimation algorithms. The block matching process in general searches for minimum block sums of absolute DFD errors between frames at times t and t+n.

The computational cost for an exhaustive search is extremely high, especially for large search ranges. This has prompted many research activities in seeking a more efficient method. Some well-known techniques include hierarchical search, as described in Bierling's "Displacement Estimation by Hierarchical Block Matching", SPIE Visual Communications and Image Processing 1988, Vol. 1001, pp.942–951, logarithmic search, such as described in Jains' "Displacement Measurement and its Application in Interframe Coding for Video Conferencing", IEEE Transactions on Communications, Vol. COM-29, pp. 1779–1806 (1981), etc. These methods are designed to reduce the computational load, but further improvements are still possible.

For video compression systems operating at high bit rates, the cost of transmitting motion vectors may be negligible. But for medium to low bit rates, the cost of transmitting motion vectors has to be taken into account. A cost function C(mv) is formulated for which an optimum estimator seeks a set of displacement vectors (mv) to minimize:

$$C(mv) = \Sigma D(mv) + \lambda^* \Sigma L(mv)$$

where D(mv) is the sum of absolute pixel DFD(mv) for each block, L(mv) is the motion vector code length, and $\lambda$ is a constant that weights the relative cost of transmitting motion vectors with respect to the total bit rate. The summation is calculated over the entire frame.

To find a global minimum for the cost function is an extremely difficult problem, especially given the fact that due to differential coding the cost of L(mv) is affected by the neighboring blocks. In practice the ideal motion estimation algorithm is likely to be adaptive to the characteristics of the moving video sequences. The motion search range has to cover not only all possible movements, but also no more than is necessary. For example when the video sequence contains slow moving scenes, the search range should be correspondingly small, otherwise spurious false matching is likely to expand the cost of L(mv). On the other hand if the movements are larger than the search range, the residue error D(mv) is high and the effectiveness of the motion compensation is degraded. So the search range has to be large enough to handle fast moving video sequences.

The two factors mentioned above show that an adaptive algorithm is most likely to achieve near optimum performance. Therefore what is desired is an adaptive motion estimation algorithm for video compression that copes with the motion dynamics of the video sequences.

BRIEF SUMMARY OF THE INVENTION

Accordingly the present invention provides an adaptive multi-modal motion estimation algorithm for video compression using an adaptive pivot and multi-modal search method. A luminance pyramid is built such that at the top (Nth) level each pixel represents $2^N * 2^N$ pixels in the base pyramid. A basic correlation is done at the top level for images at times t and t+n, with the location of a peak level defining a global motion vector between images. The global motion vector is used as a pivot point for subsequent top-level block motion search and to define a search area. The top level image is subdivided into M×N blocks and a pivot search is carried out around the pivot point in the search area. The block motion vectors from a higher level serve as initial conditions for a finer resolution level. The results of the segmentation and refinement process determine whether a zero pivot motion search is desired, such as when a camera is tracking a fast moving object. Finally the refinement and zero pivot searches are repeated for every level of the pyramid until the base, full resolution level is done, resulting in estimated motion vectors for the image.

The objects, advantages and other novel features are apparent from the following detailed description when read in conjunction with the appended claims and attached drawing.

DETAILED DESCRIPTION OF THE INVENTION

The following describes an adaptive motion search technique for a simple one directional block motion estimation process. For bi-directional motion search the same method may be easily extended.

First: Luma Pyramid. For every incoming field/frame, extract the full resolution luminance signal as the base level (level 0) of a Gaussian pyramid. The next higher level of the pyramid is calculated by low-pass filtering and sub-sampling the current level. At the top (Nth) level each pixel represents the equivalent spatial coverage of $2^N * 2^N$ pixels in the base level.

Second: Top Level, Dominant (Global) Motion Search. Using a basic correlation technique, as described in Hall's "Computer Image Processing and Recognition", Academic Press 1979, pp. 480–484, the top level images at times t and t+n are correlated. The location of a peak in of the resulting correlation surface is found. This location defines the dominant (global) motion vector (gdx, gdy) between the two images. The correlation is carried out using the whole image of the top-level image.

Third: Search Range and Pivot Point. The dominant vector is used as a pivot point (fixed offset) for subsequent top-level block motion search. From the dominant vector the shape and value of a search range is derived as shown in the following pseudo code:

```
/*Adjust search range and shape according to estimated
   global vector gdx, gdy.*/
void adjustrange(int gdx, int gdy, int total, int max, int
   min, int*xRange, int*yRange)
{
   double ratio;
   if(gdx<0) /*total is the total search area*/
   gdx=-gdx;
```

```
if gdy<0) /*so that the total computation cost is fixed*/
    gdy=-gdy;
if(gdx<min) /*min and max are limiting constants*/
    gdx=min;
if(gdy<min)
    gdy=min;
if(gdx>max)
    gdx=max;
if(gdy>max)
    gdy=max;
ratio=(double)gdx/(double)gdy,
*xRange=(int)sqrt((double)total*ratio);
*yRange=(int)sqrt((double)total/ratio);
```

Figure 1:
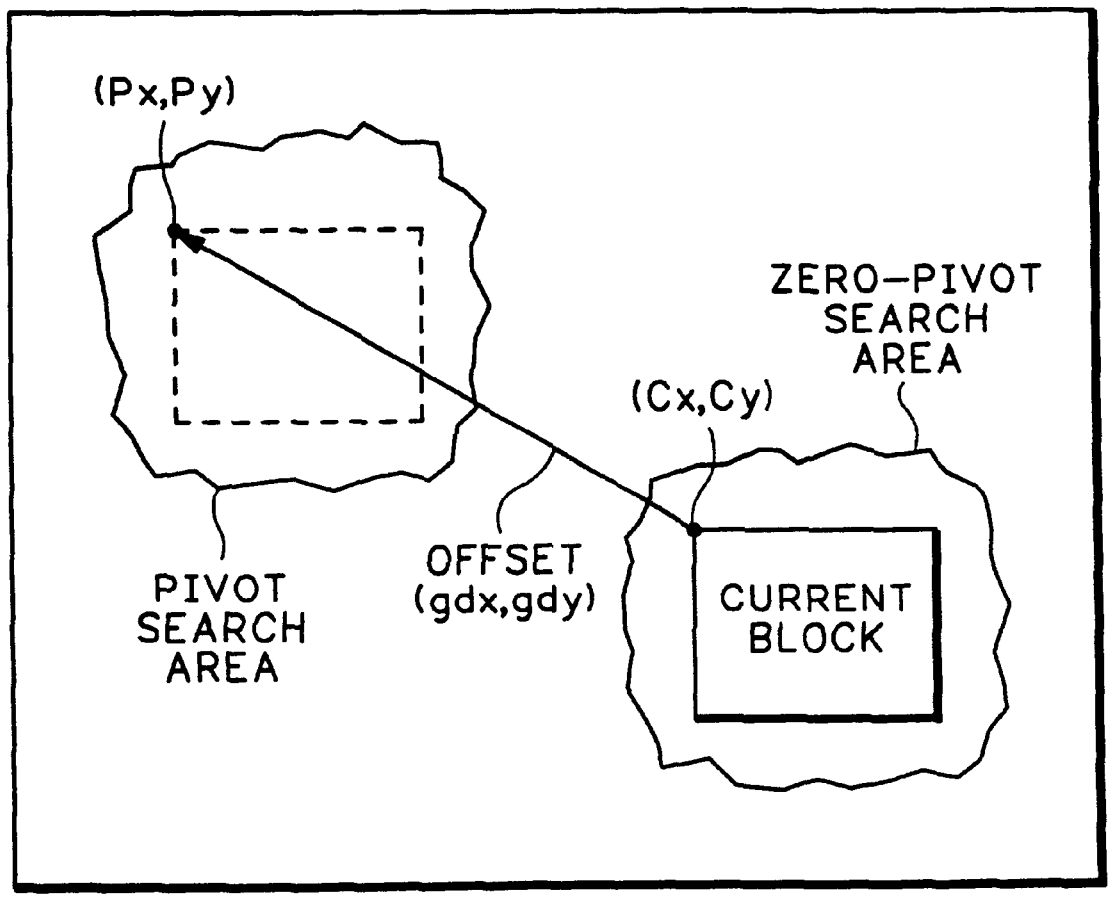
FIG. 1 is an illustrative view of the pivot and zero pivot searches according to the present invention.
Figure 2:
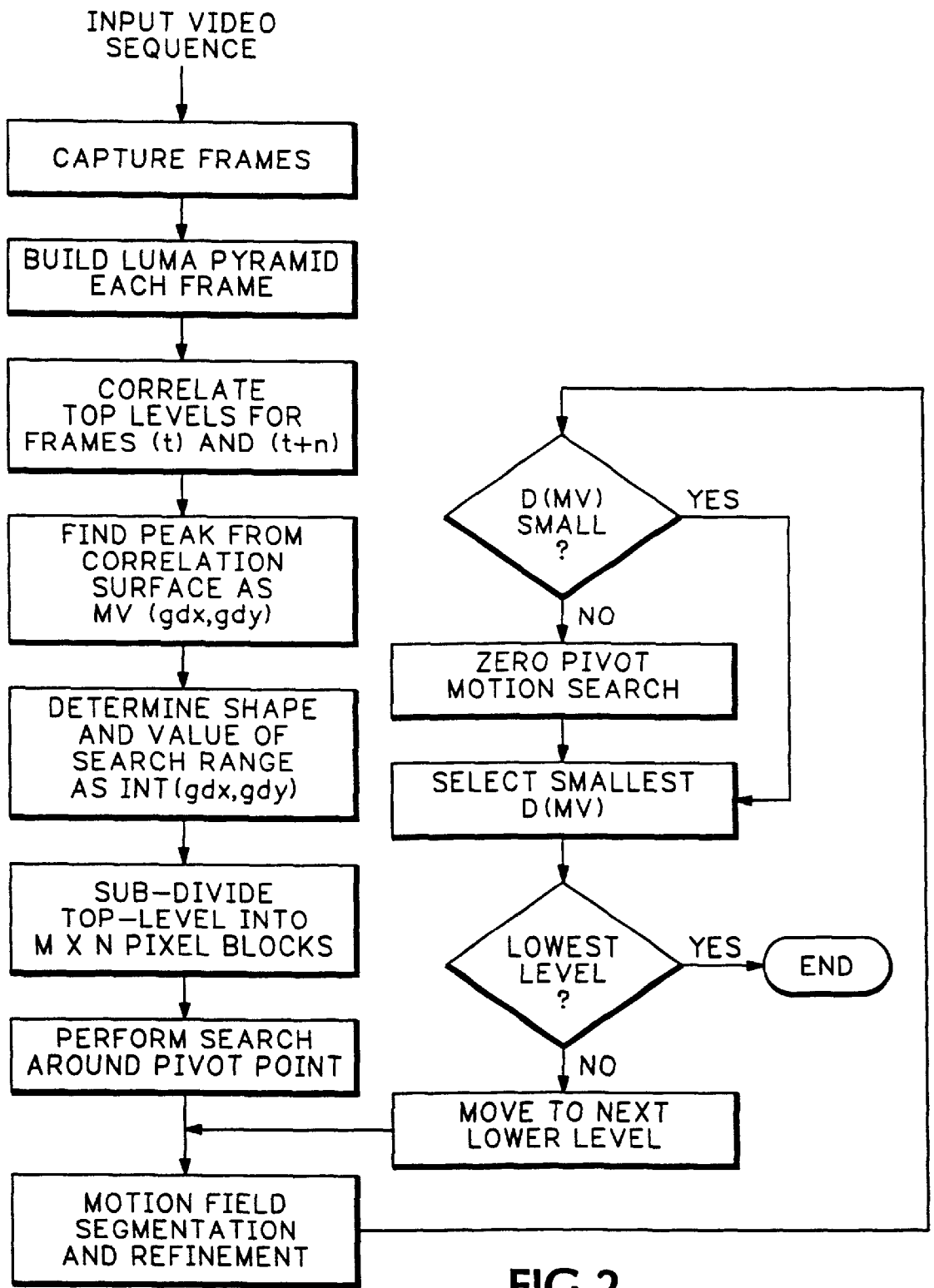
FIG. 2 is a flow diagram view of the adaptive multi-modal estimation algorithm according to the present invention.

Fourth: Block Pivot Search. Sub-divide the top-level image in M×N pixel blocks. For every block in the current top-level image, a pivot search as shown in FIG. 1 is carried out around the pivot point in the search area. The pivot point is determined by:

$$Px=gdx+Cx;$$

$$Py=gdy+Cy;$$

where Cx and Cy locate the northwest corner coordinates of the current block, Px and Py locate the northwest corner coordinates of the search area, and the search (*xRange, *yRange) is determined in step three above.

Fifth: Motion Field Segmentation and Refinement. The block motion vectors from the higher level serve as initial conditions for the next finer resolution level, such motion field segmentation and refinement being known in the art as shown in U.S. Pat. No. 5,748,247.

Sixth: Second Mode. Zero Pivot Motion Search. If the segmentation and refinement results in a small D(mv), then the zero pivot search is not necessary. The motion vector (mv) from the fifth step is chosen as the motion vector for the current block. Otherwise if D(mv) is large, it is likely that a camera is tracking a fast moving target (zero motion), with the background panning at the corresponding relative speed. In this mode of operation, which is very common for capturing sports scenes, a zero pivot motion search is necessary. A search with zero pivot and small search range constitutes this step. The motion vector that results in a smaller D(mv) between steps 5 and 6 is chosen as the motion vector for the current block.

Seventh: Working Down the Pyramid Levels. The motion field segmentation, refinement and zero pivot search steps are carried out for every block in the current pyramid level. These steps are repeated also for the next lower-pyramid level until the full resolution level is done. The result is a set of motion vectors for the full resolution image.

Thus the present invention provides an adaptive multi-modal motion estimation algorithm for video compression that adapts to the dynamics of moving video sequences and has the capability to cover very wide search ranges adaptively with a fixed computational cost.

What is claimed is:

1. A method of adaptive, multi-modal motion estimation comprising the steps of:

building a luminance pyramid for each image of an input moving image sequence;

correlating a top-level image of the luminance pyramid at times t and t+n to obtain peak location defining a global motion vector;

determining a search range from the global motion vector around a pivot point derived from the global motion vector;

searching the top-level image about the pivot point within the search range to obtain block motion vectors;

refining the block motion vectors;

selecting the refined motion vector for each block as the block motion vector if an error measure is small;

searching the top-level image about a zero displacement pivot point within the search range to obtain block motion vectors if the error measure from the refining step is large;

selecting the refined motion vector from either the zero displacement searching step or the refining step that have the smallest error measure;

repeating the refining and subsequent steps for each level of the luminance pyramid until the full resolution level of the pyramid is done, resulting in estimated motion vectors for the image.

* * * * *